United States Patent [19]

Nüssel et al.

[11] Patent Number: 4,591,775
[45] Date of Patent: May 27, 1986

[54] ELECTRIC SYNCHRONOUS MACHINE WHICH IS EXCITED VIA ROTATING RECTIFIERS

[75] Inventors: Lothar Nüssel; Alfred Radmer, both of Berlin, Fed. Rep. of Germany

[73] Assignee: Siemens Aktiengesellschaft, Berlin and Munich, Fed. Rep. of Germany

[21] Appl. No.: 700,979

[22] Filed: Feb. 12, 1985

[30] Foreign Application Priority Data

Feb. 17, 1984 [DE] Fed. Rep. of Germany ....... 3406274

[51] Int. Cl.$^4$ .......................... H02P 5/40; H02P 7/40
[52] U.S. Cl. ...................................... 318/711; 322/59; 318/712; 318/718
[58] Field of Search ............................... 318/711–719; 322/59

[56] References Cited

U.S. PATENT DOCUMENTS

| | | | |
|---|---|---|---|
| 3,098,959 | 7/1963 | Rosenberry, Jr. ................... | 318/718 |
| 3,303,410 | 2/1967 | Hoover et al. ......................... | 322/99 |
| 3,405,338 | 10/1968 | Frola ...................................... | 318/711 |
| 3,667,014 | 5/1972 | Merhof et al. ....................... | 318/715 |
| 4,038,589 | 7/1977 | Heyne et al. .......................... | 318/718 |
| 4,106,069 | 8/1978 | Trautner .............................. | 318/711 |

FOREIGN PATENT DOCUMENTS 1563329 9/1980 Fed. Rep. of Germany .
3218033 11/1983 Fed. Rep. of Germany .

Primary Examiner—David Smith, Jr.
Attorney, Agent, or Firm—Kenyon & Kenyon

[57] ABSTRACT

An electric synchronous machine is excited via rotating rectifiers by an exciter machine. To this end, the three-phase winding of the exciter machine is connected to two Y-connected rectifiers having different current conduction directions. One end of the field winding of the synchronous machine is connected to the central point of the three-phase winding. In addition, there is provided between the Y-point of the rectifiers and the other end of the field winding one thyristor each, to the control electrodes of which a parallel-connected voltage sensitive firing device is coupled. Furthermore, stationary electrical elements are connected to the exciter device via switches and auxiliary slip rings and liftable brushes. These elements contain a d-c current source which can be connected between the control electrodes and the cathodes of each thyristor in the forward direction in order to fire the former, as well as a capacitor which can be connected, for quenching, parallel to each thyristor, and also a de-energizing resistor which can be connected via antiparallel diodes in parallel with the field winding. In this manner, the direction of the field current of the synchronous machine can be reversed in order to obtain a given pole wheel position.

2 Claims, 1 Drawing Figure

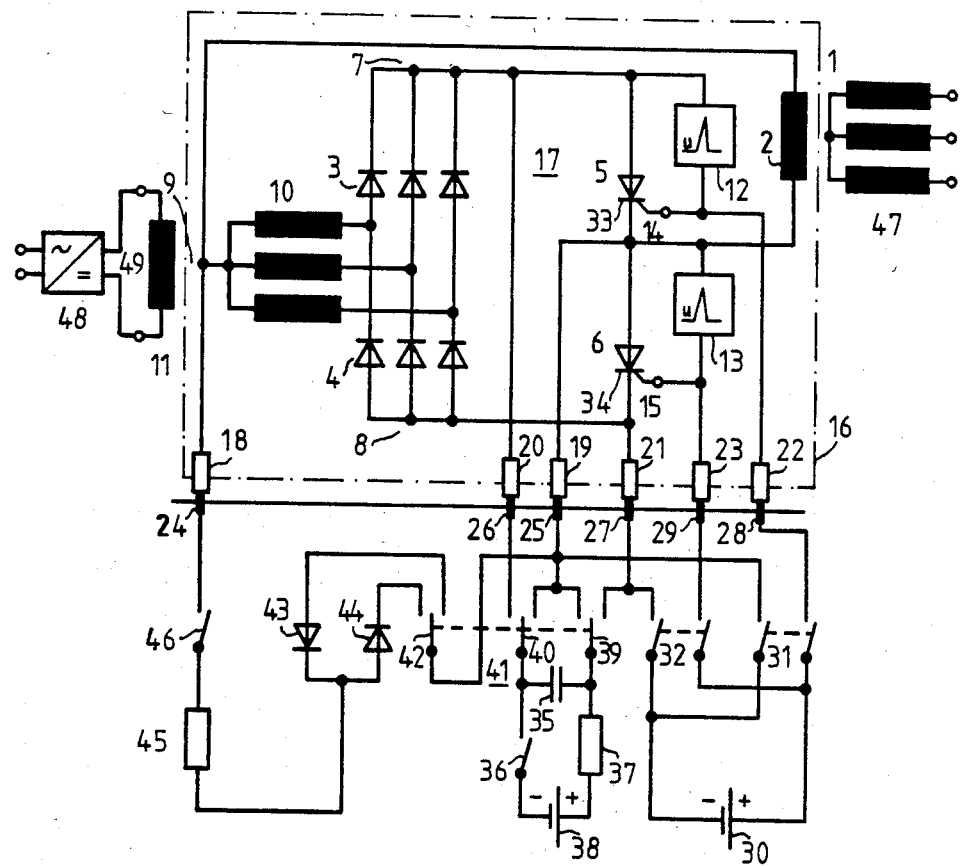

ELECTRIC SYNCHRONOUS MACHINE WHICH IS EXCITED VIA ROTATING RECTIFIERS

BACKGROUND OF THE INVENTION

The present invention relates to an electric synchronous machine which is excited via rotating rectifiers from the rotating, Y-connected three-phase winding of an exciter machine, for which purpose the outputs of the three-phase winding are coupled to the diodes of a Y-connected rectifier, the Y-point of which is connected to one end of the exciter winding of the synchronous machine, while the other end of the exciter winding is connected to the central point of the three-phase winding, and wherein auxiliary slip rings are provided on the machine shaft, one of which is connected to the central point of the three-phase winding, the slip rings engaging brushes that can be lifted off, the slip rings coupling the brushes via switches to stationary electrical elements.

Apparatus for exciting a synchronous machine via rotating rectifiers with the exciter winding connected to the center of the three phase winding is known from U.S. Pat. No. 3,303,410. The known synchronous machine is a synchronous generator, the rotating excitation circuit of which is not in operation while the synchronous machine is starting up asynchronously. Although the excitation of the synchronous generator via the rotating rectifier is designed without slip rings, two auxiliary slip rings are further provided on the shaft of the known synchronous machine, which permit connection to stationary electrical elements via brushes that can be lifted off and switches. This circuitry, however, relates to a device for detecting shorts to ground in the rotor which is connected only temporarily and thus does not influence the operation of the synchronous generator which otherwise has no slip rings.

While in synchronous generators excited without slip rings, the excitation circuit is not operative during the asynchronous starting of the machine, the latter constitutes normal operation for synchronous motors excited without slip rings. In this connection, it is known, for instance, from German Pat. No. 15 63 329 and DE-OS 32 18 033, to excite the synchronous motor by means of an external-pole synchronous exciter machine without slip rings by letting the rotating three-phase winding of the external-pole synchronous exciter machine fed via a rotating rectifier connected in the three-phase bridge circuit feed the exciter winding of the synchronous motor. To this end, a series circuit of two thyristors poled in the forward direction of the field current is connected parallel to the exciter winding, the connecting line of which is connected to one lead of the three-phase winding. In addition, a firing device which fires in dependence on the voltage is connected between the positive pole of the field winding and the control electrodes of the thyristors, so that the negative half-waves of the alternating field current flow through the thyristors and the excitation circuit is protected against overvoltages. These firing devices are operative up to the time of the synchronization of the synchronous motor.

It is further known that several converter sets, each comprising a synchronous generator driven by a synchronous motor, can operate in parallel only if all drive motors are operated with the same pole wheel position, since otherwise the synchronous generators to be switched cannot be synchronized. Therefore, it is necessary to be able to correct the pole wheel position in such synchronous/synchronous converters subsequently by letting the drive motor slip in a specificed manner, the drive motors of which reach the synchronous speed always without excitation and in general without the correct pole position relative to each other because a counter-torque is lacking during the unloaded asynchronous start up.

SUMMARY OF THE INVENTION

It is an object of the present invention to provide an operationally slip-ring-less exciter arrangement for a synchronous machine and which further makes possible repeated reversals of the field current and therefore an adjustment of the pole-wheel position.

These and other objects of the present invention are achieved by an exciter arrangement for an electric synchronous machine, the synchronous machine having an exciter winding excited by rotating rectifier means from a rotating, Y-connected three-phase winding of an exciter machine, three outputs of the three-phase winding being coupled to the rectifier means, the rectifier means being Y-connected and having a Y-point, the Y-point being coupled to one end of the exciter winding, the other end of the exciter winding being coupled to a central point of the three-phase winding of the exciter machine, auxiliary slip ring means being provided on a rotating shaft of the exciter machine, the auxiliary slip ring means being coupled to the central point of the three-phase winding and being coupled to stationary electrical means by liftable brush means contacting the slip ring means and further including switch means coupled to the brush means, said rectifier means comprising first and second rectifier means for conducting current from the three-phase winding having different current conduction directions, each rectifier means having a Y-point, and further comprising thyristor means coupled between respective Y-points of the first and second rectifier means and one end of the exciter winding, the control electrodes of each of the thyristor means being coupled to voltage sensitive firing means, the auxiliary slip ring means comprising first auxiliary slip ring means coupled to one end of the exciter winding, second auxiliary slip ring means coupled to the other end of the exciter winding, third and fourth auxiliary slip ring means respectively coupled to the Y-points of the first and second rectifier means, fifth and sixth auxiliary slip ring means coupled to the respective control electrodes of the first and second thyristor means, the stationary electrical means comprising d-c voltage source means selectively coupled between the control electrode and the cathode of respective ones of the thyristor means so as to fire the respective thyristor means, capacitor means selectively coupled in parallel across the cathode and anode of each thyristor means and de-energizing means selectively coupled in parallel with the exciter winding by selected ones of anti-parallel connected diodes means.

After the normal asynchronous start-up of the synchronous machine, a thyristor means can be fired, through this special design of the exciter circuit and after the exciter machine is excited by a current pulse fed in externally via the auxiliary slip ring means, so that the synchronous machine is excited. If the synchronous machine has not occupied the desired pole wheel position, it can be caused to slip by reversing the field current. To this end, the exciter machine is first de-energized, and the current flowing through the fired thyristor means is allowed to decay to its minimum value given by the remanence. Thereupon, a charged capacitor means is connected in parallel with the thyristor means via other ones of the auxiliary slip ring means and brush means so that the thyristor means is turned off or quenched. Since a certain amount of energy remains in the exciter winding due to its inductivity, the latter is subsequently discharged by connecting a de-energizing resistor means in parallel with the exciter winding. Thereupon, the other thyristor means can again be fired externally by a current pulse in the opposite direction, so that then the exciter current flows through the field winding of the synchronous machine in the opposite direction. Thereby, the synchronous machine is caused to slip and occupy another pole wheel position. This process can be repeated as many times as desired, until the desired pole wheel position is reached.

The exciter circuit according to the invention has the further advantage that the synchronous machine, if it is employed as a reactive power machine, can be used with positive field current for delivering inductive reactive power as well as with negative field current for furnishing capacitive reactive power, where the magnitude of the capacitive reactive power to be delivered can be selected down to shortly below the static stability limit of the synchronous machine.

It is advantageous to provide among the stationary elements of the exciter circuit a charging device for the capacitor means which can be connected to the former via switch means. Thereby, the capacitor means can be recharged to a high voltage again after quenching the thyristor means.

BRIEF DESCRIPTION OF THE DRAWING

The invention will be explained further with the aid of the embodiment shown in the single drawing FIGURE which is a circuit diagram of the exciter arrangement according to the invention.

DETAILED DESCRIPTION

With reference now to the drawing FIGURE, a synchronous machine 1, which may be the drive motor of a synchronous generator, not shown, is part of a synchronous/synchronous converter. The exciter arrangement according to the invention for the synchronous motor is indicated generally by reference numeral 17. The field or exciter winding 2 of the synchronous machine is fed via two rotating rectifiers 3, 4 having different current conduction directions which are each Y-connected, and two thyristors 5, 6 are connected in series in the same sense and are connected to the Y-points 7 and 8 of the rectifiers 3 and 4, respectively. One end of the exciter winding 2 is coupled also to the connection between the thyristors 5 and 6. The other end of the exciter winding 2 is connected to the central or Y-point 9 of the three-phase winding 10, connected in a Y circuit, of the external-pole exciter machine 11. The outputs of the three-phase winding 10 are connected to the rectifiers 3 and 4 as shown.

Firing devices 12 and 13, which fire as a function of the voltage, are further provided for the thyristors 5 and 6. Firing device 12 is connected in parallel with thyristor 5 such that it is coupled between the anode of thyristor 5 and control electrode 14, while firing device 13 is coupled in parallel with thyristor 6 such that it is coupled between the anode of thyristor 6 and control electrode 15.

The rotating part 16 of the exciter arrangement 17, framed by dash-dotted lines, further contains six auxiliary slip rings 18 to 23 which are arranged on the shaft, not shown, of the rotating part 16. Of these, auxiliary slip rings 18 and 19 are connected to the ends of the field winding 2; auxiliary slip rings 20 and 21 to the Y-points 7, 8 of the rectifiers 3 and 4; and auxiliary slip rings 22 and 23 are connected to the control electrodes 14, 15 of thyristors 5 and 6. Brushes 24 to 29 are associated with the auxiliary slip rings 18 to 23 in such a manner that brush 24 is associated with the auxiliary slip ring 18; brush 25 with the auxiliary slip ring 19; brush 26 with the auxiliary slip ring 20; brush 27 with the auxiliary slip ring 21; brush 28 with the auxiliary slip ring 22; and brush 29 with the auxiliary slip ring 23. These brushes 24 to 29 can be lifted off, i.e., they can be raised out of engagement with the slip rings. The brushes are coupled to stationary electrical elements which serve for firing the thyristors 5 and 6, for extinguishing them and for de-energizing the field winding 2.

A d-c current source 30 is provided as one of the stationary elements, the outputs of which are connected to the two-pole switches 31 and 32. The positive pole of d-c current source 30 is coupled via switch 31 to brush 28, auxiliary slip ring 22 and control electrode 14 of thyristor 5, while, via switch 32, brush 29 and auxiliary slip ring 23 it is connected to control electrode 15 of thyristor 6. The negative pole of d-c current source 30 is similarly connected via switch 31 to brush 25 and auxiliary slip ring 19 to cathode 33 of thyristor 5, and via switch 32, brush 27 and auxiliary slip ring 21, to cathode 34 of thyristor 6. Thus, thyristors 5 and 6 can be fired externally and selectably by appropriate closing of the switches 31 and 32.

Additional stationary elements furthermore are provided. A capacitor 35 is coupled via switch 36 and a charging resistor 37 to a d-c current source 38 and can be charged by the latter to a high voltage. In addition, capacitor 35 is connected to two movable switch elements 39, 40 of a three-pole switch 41 which can occupy two different switch positions. If the switch 41 is in its right-hand switch position, the capacitor 35 is connected via switching element 39, brush 27 and auxiliary slip ring 21 to cathode 34 of thyristor 6 and similarly via switching element 40, brush 25 and auxiliary slip ring 19, to its anode, so that the capacitor 35 is connected in parallel with the thyristor 6 and extinguishes the later. Correspondingly, a parallel connection of the capacitor 35 to the thyristor 5 and its quenching is achieved in the left-hand position of switch 41.

The third movable switch contact 42 of switch 42 establishes in its right-hand switch position a connection to the diode 43 and in its left-hand switch position, a connection to the diode 44. Diodes 43, 44 are connected antiparallel and lead to a de-energizing resistor 45, one end of which is therefore connected via the diodes 43 and 44 and the movable switching element 42 to the liftable brush 25 and auxiliary slip ring 19 and thence to the one end of exciter winding 2. The other end of the de-energizing resistor 45 is connected via a switch 46 to the liftable brush 24 and thus, via auxiliary slip ring 18, to central point 9 and thus to the other end of the field winding 2. The de-energizing resistor 45 is thus connected in parallel to the field winding 2 and can absorb the inductive energy remaining in it after the thyristors 5 and 6 have been extinguished.

The exciting arrangement 17 of the synchronous motor 1 is operated as follows:

The synchronous motor 1 is first started up asynchronously by feeding its three-phase winding 47 with current while the exciter machine 11 remains unexcited. The thyristors 5, 6 are fired as a function of voltage by their firing devices 12, 13 and release the current path for the respective half-waves of the starting-up a-c current at the slip frequency induced in the field winding 2. When the start-up is completed, the exciter machine 11 can be excited. This purpose is served by an auxiliary excitation device 48 which feeds the exciter winding 49 of the exciter machine 11 with d-c current. For exciting the synchronous motor 1, the thyristor 5 is now fired by a current pulse from the d-c source 30. To this end, switch 31 is closed so that the d-c source 30 is connected via brush 25 and auxiliary slip ring 19 to the cathode 33 of thyristor 5 and via brush 28 and auxiliary slip ring 22 to control electrode 14 of thyristor 5 and thus fires the latter. The synchronous motor 1 is thereby synchronized and occupies a definite pole wheel position.

If this pole wheel position does not coincide with the deisred position, the synchronous motor 1 must be allowed to slip and be excited again with the reversed direction of the exciter current. To this end, the exciter machine 11 is first de-energized and the current through the thyristor 5 is allowed to decay to the minimum value possible as given by the remanence. Thereafter, thyristor 5 is connected to capacitor 35 externally via auxiliary slip ring 20 and liftable brush 26 as well as auxiliary slip ring 19 and brush 25 when three-pole switch 41 which is switched into the left switch position. The capacitor 35, which had previously been charged to a high voltage by source 38, extinguishes thyristor 5. By the lefthand switch position of switch 41, the auxiliary slip ring 19 and brush 25 are furthermore connected via the movable switch element 42 to the de-energizing resistor 45 via the diode 44. Since the switch 46 had previously been closed, de-energizing resistor 45 is still connected via brush 24 and auxiliary slip ring 18 in parallel with field winding 2 and thus absorbs the energy remaining therein due to the exciter inductance. Thereupon, the switch 46 is opened again and the three-pole switch 41 is placed in its neutral position. The exciter machine 11 can then be excited again and thyristor 6 is then fired by means of the d-c source 30 by closing the switch 32 so that the exciter current in the field winding 2 of the synchronous machine 1 now flows in the opposite direction. This causes the synchronous motor 1 to slip and to then occupy a different pole wheel position when it is pulled into synchronism.

If this new pole wheel position of the synchronous machine 1 is the desired one, the synchronous machine is excited without slip rings via the rotating rectifiers 3 and 4, respectively, since all brushes 24 to 28 are then lifted. If this new pole wheel position is not the deisred one, a new reversal of the field current must be made. In the meantime, the capacitor 35 is also charged again to a voltage by closing the switch 36.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than a restrictive sense.

What is claimed is:

1. An exciter arrangement for an electric synchronous machine, the synchronous machine having an exciter winding excited via rotating rectifier means from a rotating, Y-connected three-phase winding of an exciter machine, three outputs of the three-phase winding being coupled to the rectifier means, the rectifier means being Y-connected and having a Y-point, the Y-point being coupled to one end of the exciter winding, the other end of the exciter winding being coupled to a central point of the three-phase winding of the exciter machine, auxiliary slip ring means being provided on a rotating shaft of the exciter machine, said auxiliary slip ring means being coupled to said central point of the three-phase winding and being coupled to stationary electrical means by liftable brush means contacting said slip ring means and further including switch means coupled to said brush means, said rectifier means comprising first and second rectifier means for conducting current from said three-phase winding having different current conduction directions, each rectifier means having a Y-point, and further comprising first and second thyristor means coupled between respective Y-points of said first and second rectifier means and one end of said exciter winding, the control electrodes of each of said thyristor means being coupled to voltage sensitive firing means, the auxiliary slip ring means comprising first auxiliary slip ring means coupled to one end of the exciter winding, second auxiliary slip ring means coupled to the other end of the exciter winding, third and fourth auxiliary slip ring means respectively coupled to the Y-points of the first and second rectifier means, fifth and sixth auxiliary slip ring means coupled to the respective control electrodes of the first and second thyristor means, the stationary electrical means comprising d-c voltage source means selectively coupled between the control electrode and the cathode of respective ones of the thyristor means so as to fire the respective thyristor means, capacitor means selectively coupled in parallel across the cathode and anode of each thyristor means, and de-energizing means selectively coupled in parallel with the exciter winding by selected ones of anti-parallel connected diode means.

2. The exciter arrangement for an electric synchronous machine recited in claim 1, wherein the capacitor means is coupled to charging means via switch means.

* * * * *